United States Patent Office 3,037,968
Patented June 5, 1962

3,037,968
PROCESS CONSISTING ESSENTIALLY OF REACTING A THIOUREA COMPOUND AND A HALOGENATED ISOOLEFIN-MULTIOLEFIN COPOLYMER, RESULTING PRODUCT AND VULCANIZATE OF SAME
Delmer L. Cottle, Highland Park, and Leon S. Minckler, Jr., and Morton Fefer, Metuchen, N.J., assignors to Esso Research and Engineering Company, a corporation of Delaware
No Drawing. Filed Apr. 21, 1959, Ser. No. 807,757
16 Claims. (Cl. 260—79)

This invention relates to halogen-containing novel rubber reaction products and to methods of preparing and using the same. More particularly, the present invention relates to reaction products of isoolefin-multiolefin rubbery copolymers, particularly butyl rubber, with a minor proportion of a halogenating agent; said reaction products being further modified by reaction with thiourea compounds prior to curing with, say, zinc oxide and/or sulfur or accelerators such as thiuram sulfides and/or thiocarbamates. The halogenated rubbery copolymers, suitable for use in accordance with the present invention, generally contain a major proportion, preferably at least 85 weight percent, of isoolefins and a minor proportion, preferably not more than about 15 weight percent of multiolefins.

Butyl rubber, which comprises the low unsaturation copolymerization product of a major proportion of an isoolefin of about 4 to 8 carbon atoms and a minor proportion of a multiolefin of about 4 to 14 carbon atoms, has been available commercially for a number of years and has found utility in the manufacture of certain products such as automobile inner tubes, electrical insulation, tire curing bags or bladders and the like. In most respects, butyl rubber is superior to natural rubber or any of the very high unsaturation synthetic rubbers such as dienestyrene rubber, diene-nitrile rubber, polychloroprene rubber, etc., which have an unsaturation in the order of about 300 to 400 iodine number (Wijs). This is because isoolefin-multiolefin type rubbery copolymers, particularly butyl rubber, both before and after vulcanization, are more resistant to oxidation and attack by chemical agents than the above-mentioned very highly unsaturated rubbery materials.

Nevertheless, butyl rubber or even halogenated isoolefin-multiolefin copolymers such as halogenated butyl rubber, has not exhibited a combination of high unsaturation and high molecular weight together with retention of physical properties upon heat aging. It is, however, very desirable to have available a butyl-type rubber or other rubbery copolymer of isoolefins and multiolefins having such a combination of properties as mentioned above. Such improved rubbery copolymers, for instance, have been found to be extremely useful in tires, particularly in the carcass layer, as well as in tire casing curing bags or bladders, conveyor belting, steam hose, supersonic aircraft tires, gaskets, wire insulation, sterilizing equipment, can closure seals, etc.

In accordance with the present invention, the above disadvantages are overcome and highly unsaturated halogenated butyl rubber polymers of increased molecular weight, which are resistant to heat aging, are produced by halogenating the butyl rubber copolymer as more fully described hereinafter and by reacting the halogenated copolymer formed, prior to compounding and curing, with a minor proportion of a thiourea compound. In practicing the present invention, it is preferred to first form a 2 to 50, preferably a 5 to 20, weight percent solution of the halogenated butyl rubber in an inert solvent such as $C_5$ to $C_{10}$ alkane, $C_6$ to $C_{18}$ aromatic hydrocarbon, halogenated alkanes, halogenated aromatic hydrocarbons, tetrahydrofuran, mixtures thereof, etc., and react the solution for about 1 to 600 minutes, preferably for about 20 to 200 minutes (e.g., 50 minutes) at about 20° to about 180° C., preferably at about 40° to 80° C., with about 0.05 to 15.0, advantageously about 0.1 to 10.0 and preferably about 0.3 to 5.0 weight percent based on halogenated butyl rubber, of a thiourea compound such as thiourea and/or derivatives of thiourea prior to compounding and curing. The thiourea compound advantageously also has been dissolved to form a 0.1 to 100, preferably a 1 to 10 weight percent solution in an inert solvent or solvents such as mentioned above in which the thiourea compound is soluble and/or such thiourea solvents as alcohols, ketones, ethers and water and other polar solvents. In general, the thiourea compound forms a 0.01 to 50 weight percent solution in these last-mentioned solvents.

Isoolefin-multiolefin butyl rubber copolymers of the above general type, especially where the copolymer contains about 85 to 99.5% (preferably about 95 to 99.5%) of a $C_4$ to $C_7$ or $C_8$ isoolefin such as isobutylene, 2-methyl-1-butene and/or 3-methyl-1-pentene or the like, with about 15 to 0.5% (preferably about 5 to 0.5 weight percent of a multiolefin of about 4 to 14, preferably about 4 to 8 or 10 carbon atoms, are commonly referred to in patents and literature as "butyl rubber" or GR–I rubber (Government Rubber-Isobutylene) and, for example, are referred to as "butyl rubber" in many patents and in the textbook "Synthetic Rubber" by G. S. Whitby (1954) edition by John Wiley & Sons, Inc.), pages 608–609, etc. The expression "butyl rubber" when employed in the specification and claims is intended to include copolymers containing about 90 to 99.5% by weight of an isoolefin of about 4 to 7 carbon atoms and about 10 to 0.5% of a conjugated multiolefin of about 4 to 10 carbon atoms. The preparation of butyl-type rubbers is described in U.S. Patent 2,356,128 to Thomas et al., and also in other patents as well as in technical literature. In general, the rubber comprises the reaction product of a $C_4$ to $C_7$ isoolefin (preferably isobutylene) with a multiolefin comprising a $C_4$ to $C_{10}$ (preferably a $C_4$ to $C_6$) conjugated diolefin such as isoprene, butadiene, dimethyl butadiene, piperylene, etc., or such multiolefins as myrcene, allo-ocimene, dimethallyl, vinyl fulvenes, etc. The reaction product comprising isobutylene and isoprene is preferred.

In preparing butyl rubber, a low molecular weight isoolefin, such as 2-methyl-butene-1, 3-methyl-butene-1, or preferably isobutylene, is copolymerized with a multiolefin such as a conjugated diolefin, preferably isoprene, at relatively low temperatures; generally from about 0° C. to about −200° C. or lower; an advantageous range being from about −40° C. to about −180° C., preferably from about −80° C. to −160° C. The copolymerization is advantageously conducted in the presence of a Friedel-Crafts catalyst such as aluminum chloride, titanium tetrachloride, boron trifluoride, uranium chloride, aluminum ethoxy-chloride, etc., which is dissolved say in a $C_1$ to $C_3$ alkyl halide such as ethyl or methyl chloride, or dissolved in carbon disulfide or an equivalent solvent.

To produce halogenated butyl rubber, rubbery materials of the type of butyl rubber are halogenated so as to contain about at least 0.5 weight percent (preferably at least about 1.0 weight percent) combined halogen but not more than "X" weight percent fluorine or chlorine, or not more than about 3 "X" weight percent combined bromine or iodine wherein:

$$"X" = \frac{M_3 L}{(100-L)M_1 + L(M_2 + M_3)} \times 100$$

and:

$L$=mole percent of the multiolefin in the polymer
$M_1$=molecular weight of the isoolefin
$M_2$=molecular weight of the multiolefin
$M_3$=atomic weight of halogen.

Restated, there should be at least about 0.5 weight percent of combined halogen in the polymer but not more than about one atom of combined fluorine or chlorine or 3 atoms of combined bromine or iodine per double bond in the polymer.

Suitable halogenating agents which may be employed are gaseous chlorine, liquid bromine, iodine monochloride, hydrogen fluoride, alkali metal hypobromites or hypochlorites, sulfur bromides or chlorides, bromo- or chloro-hydantoins, N-bromosuccinimide, and other common halogenating agents.

The halogenation is generally conducted at about $-50°$ C. to about $+200°$ C., advantageously at above $0°$ to $100°$ C. and preferably at about $20°$ to $50°$ C., depending upon the particular halogenating agent, for about one minute to several hours (e.g., 3.0 minutes). An advantageous pressure range is from about 0.5 to 400 p.s.i.a., atmospheric pressure being satisfactory since the pressure is not critical. The halogenation conditions are regulated to halogenate the rubbery copolymer to the extent above mentioned. It is preferred to halogenate the butyl rubber copolymer while dissolved in a $C_4$ to $C_{10}$ hydrocarbon, $C_4$ to $C_{10}$ halogenated hydrocarbons, carbon tetrachloride, chloroform, hexane, benzene and/or chlorobenzene, etc.

The resulting halogenated butyl rubber polymer may be recovered in various manners. The polymer may be precipitated with an alcohol or acetone or any other known non-solvent for the rubber and dried under about 1 to 760 millimeters or higher of mercury pressure absolute at above about $0°$ to $180°$ C., preferably at about $50°$ to $150°$ C. (e.g., $70°$ C.). Other methods of recovering the halogenated butyl rubber polymer from the hydrocarbon solution of the same are by conventional spray or drum drying techniques. Alternatively, a halogenated butyl rubber-containing solution may be injected into a vessel containing steam and/or agitated water heated to a temperature sufficient to flash off the solvent and form an aqueous slurry of halogenated butyl rubber. The halogenated butyl rubber may then be separated from this slurry by filtration or the like, dried and recovered as a "crumb" or as a dense sheet or slab by conventional milling and/or extruding procedures.

The halogenated copolymer formed advantageously has a viscosity average molecular weight between about 50,000 or 200,000 and 1,000,000 or 4,000,000, and a mole percent unsaturation between about 0.5 to 10.0 or 15.0, preferably about 0.6 to 5.0. This copolymer when chemically modified in accordance with the present invention with thiourea compounds and subsequently cured in the presence of zinc oxide or other curatives, not only has a good elastic limit, tensile strength, abrasion resistance and flexure resistance, but also high unsaturation. It may be employed not only as an inner lining, tie-ply, tread or sidewall in tires, but also in the manufacture of curing bags and diaphragms, conveyor belting, steam hose, etc., since the cured copolymer is extremely resistant to heat aging.

It is also within the purview of the present invention to react with thiourea compounds, halogenated tripolymers of isoolefins, multiolefins and a third or even a fourth monoolefinic compound containing an aromatic nucleus such as styrene, alpha methyl styrene, p-methyl styrene, indene, dihydro-naphthalene, p-chlorostyrene, dichlorostyrene and mixtures thereof, etc. The amount of the monoolefinic compound employed is advantageously in a minor proportion based on total reacting monomers and is preferably employed in amounts such that between about 0.05 and 20.0 (e.g., about 0.5 to 5.0) weight percent of the monoolefinic aromatic compound is combined in the resulting copolymer. A particularly advantageous isoolefin-multiolefin-containing copolymer of this last-mentioned type, which is suitably halogenated and reacted with thiourea compounds in accordance with the present invention, comprises the copolymerization product of about 85 to 99 parts by weight of a $C_4$ to $C_6$ isoolefin, about 0.5 to 10.0 parts by weight of a $C_4$ to $C_6$ multiolefin and about 0.0 to 5.0 parts by weight of such vinyl aromatic compounds as hereinbefore mentioned (i.e., preferably styrene).

Typical thiourea compounds suitable for use in accordance with the present invention include, among others, compounds represented by the following formulae, which may be used singly or in combination:

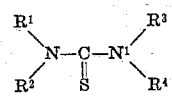

in which $R^1$ to $R^4$ include hydrogen, $C_1$ to $C_{18}$ alkyl groups, $C_6$ to $C_{18}$ aryl groups, $C_7$ to $C_{18}$ alkaryl groups and/or $C_7$ to $C_{18}$ aralkyl groups forming such compounds as thiourea; diethyl thiourea; dibutyl thiourea; diphenyl thiourea; mixtures thereof, etc.;

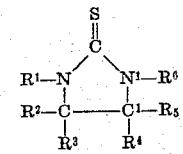

in which $R^1$ to $R^6$ include hydrogen or $C_1$ to $C_{12}$ alkyl groups forming such compounds as ethylene thiourea; N-methyl ethylene thiourea; N,N'-dibutyl ethylene thiourea; C-ethyl ethylene thiourea; C,C'-diisopropyl ethylene thiourea; mixtures thereof, etc.; or

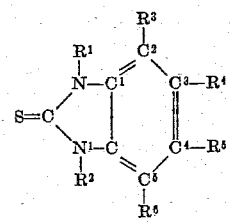

in which $R^1$ to $R^6$ include hydrogen or $C_1$ to $C_{12}$ alkyl groups forming such compounds as orthophenylene thiourea; N,N'-dimethyl orthophenylene thiourea; 3-isopropyl orthophenylene thiourea; 3,4-dibutyl orthophenylene thiourea; mixtures thereof, etc.

In the vulcanization of thiourea-modified halogenated butyl rubber, 100 parts by weight of thiourea-modified halogenated butyl rubber are advantageously compounded into the following:

| Component | Typical Range in parts by weight | Preferred Range |
|---|---|---|
| Thiourea-modified halogenated butyl rubber | 100 | 100 |
| Zinc oxide | 2.0–30.0 | 3–20 |
| Tackifier (e.g., phenol-formaldehyde resin) | 0–20 | 0–15 |
| Carbon black (e.g., MPC black) | 0–100 | 20–80 |
| Hydrated silica (e.g., Hi-Sil-202) [1] | 0–100 | 0–70 |
| Plasticizer oil [2] | 0–30 | 0–25 |
| Antioxidant (e.g., N-lauroyl-p-amino phenol) | 0–2.5 | 0–1.5 |
| Sulfur | 0–10 | 0–5 |
| Accelerator (e.g., benzothiazyl disulfide or mercaptobenzothiazole) | 0–2.0 | 0–1.5 |
| Ultra-accelerator (e.g., tetramethyl thiuram disulfide and/or tellurium diethyl dithiocarbamate) | 0–5 | 0.1–3.0 |
| Organic nitrogen-containing compound (e.g., hexamethylene tetramine) | 0–5 | 0–3.0 |

[1] Hi-Sil-202 is a pigment of very fine particle size of precipitated hydrated silica having the following properties listed:

Property: Value
Bulk density (lbs. per cubic foot) _____ 8.0
Specific gravity _____ 1.95
Average particle size (millimicrons) ____ 22
Moisture (percent) _____ 5
pH _____ 7.5
Refractive index _____ 1.46
Ignition loss (percent, max.) _____ 10
$SiO_2$ (percent) _____ 84
CaO (percent) _____ 1.0
NaCl (percent, max.) _____ 1.0
$Fe_2O_3$ (percent, max.) _____ 0.3
$Al_2O_3$ (percent, max.) _____ 4.0

[2] The plasticizer oil is preferably a hydrocarbon oil derived from a paraffinic or naphthenic base crude having the following characteristics:

Property: General range
Specific gravity _____ 0.85–0.97
Flash point, ° F. (open cup method) __ 400–550
Viscosity, SSU at 100° F _____ 200–1000
Viscosity, SSU at 210° F _____ 30–200
Iodine number (cg./g.) _____ 0–30

The uncured thiourea-modified halogenated butyl rubber copolymer may also be blended with about 1 to 10%, preferably 2 to 4% of a stabilizer such as a group II metal silicate, particularly calcium silicate, and/or with about 1 to 5%, preferably 2 to 4% of an adsorbent deactivator such as various high boiling polar compounds, e.g., ethylene glycol, during or preferably before the rubber is compounded with the zinc oxide with or without carbon black.

Vulcanization of such compositions as the foregoing is advantageously at about 250° to 400° F. for about 2 to 100 minutes. When used in the tie-plies the vulcanization is generally for about 5 to 100 minutes at about 250° to about 350° F. For a similar curative system, the curing time for an inner lining will be for substantially shorter periods of time (e.g., 3 to 50 minutes) at higher temperatures (e.g., up to about 50° F. higher) as compared to that required for tie-plies.

For vulcanization purposes, as well as the above components, the thiourea-modified halogenated butyl rubber copolymer, before curing, may be further compounded with various fillers such as clays, silica, titanium dioxide, etc., as well as with tars, waxes, resins, organic phosphates, polypropylene, polyethylene, butadiene-styrene copolymer oils, dialkyl tin sulfides, diisothiocyanates, p-quinone dioxime, p-quinone dioxime dibenzoate, etc.

Covulcanization of the thiourea-modified halogenated butyl rubber with such materials as natural rubber, GR–S rubber, neoprene, etc. according to the present invention, may be at temperatures from between about 200° F. to about 450° F., preferably at about 250° to 350° F. for from about several seconds (e.g., 5) up to about 5 days or more. Normally, the covulcanization is from about 10 minutes to 20 hours at about 200° F. to about 0.5 to 20.0 minutes at about 450° F. depending upon the nature and amount of the added rubber covulcanized with the modified butyl rubber. For most uses, the optimum co-vulcanization conditions are from about 0.5 minute to 5.0 hours at about 270° to 350° F., the higher the temperature the shorter the co-vulcanization time and vice versa.

In order to more fully illustrate but not to limit the present invention, the following experimental data are given:

EXAMPLE 1

*Sample (a).*—Three grams of ethylene thiourea were dissolved in 500 ml. of chloroform and 4000 ml. of benzene. To the resulting solution were added 500 grams of a brominated butyl rubber isobutylene-isoprene copolymer having a Mooney viscosity at 212° F. for 8 minutes of 48, an intrinsic viscosity of 1.38, an iodine number of 4.2 cg./g. and containing 2.16 weight percent based on copolymer of bromine. The brominated butyl rubber copolymer was dissolved in 4000 ml. of benzene. Reaction was allowed to ensue at 58° C. for four hours, followed by precipitation of the modified copolymer with methyl ethyl ketone and washing with isopropanol. The product formed was dried overnight at 70° C. under 1.0 mm. of pressure absolute.

*Sample (b).*—The same general procedure as in sample (a) was repeated as a control omitting the reaction with the thiourea compound with the following results:

| Sample | Iodine No. (cg./g.) | Intrinsic Viscosity |
|---|---|---|
| (a) Thiourea-modified brominated butyl | 48.2 | 1.57 |
| (b) Regular brominated butyl | 4.2 | 1.38 |

The above data show that by modifying halogenated butyl rubber with a thiourea compound, the resulting halogenated rubber is increased in unsaturation (i.e., increased iodine number) and the intrinsic viscosity is also increased.

EXAMPLE 2

*Sample (c).*—Ten grams of ethylene thiourea were dissolved in 500 ml. of chloroform and 4000 ml. of benzene. To the resulting solution were added 400 grams of chlorinated butyl rubber isobutylene-isoprene copolymer having a viscosity average molecular weight of 475,000, a Mooney viscosity at 212° F. for 8 minutes of 65, a mole percent unsaturation of 1.3, and a combined chlorine content of 1.1 weight percent based on copolymer. The chlorinated butyl rubber copolymer was dissolved in 4000 ml. of benzene. Reaction was allowed to ensue at 58° C. for 4 hours followed by precipitation of the modified copolymer with methyl ethyl ketone and washing with isopropanol. The product formed was dried overnight at 70° C. under 1.0 mm. of pressure absolute.

*Sample (d).*—The same general procedure as in sample (c) was repeated as a control omitting the reaction with the thiourea compound.

Portions of samples (a), (b), (c) and (d) were compounded into the following formulations, cured for 45 minutes at 307° F. and heat aged for 48 hours at 300° F. in order to determine their heat aging resistance. The compounding was as follows:

| Component | Formulation (1) | Formulation (2) | Formulation (3) |
|---|---|---|---|
| Polymer | 100 | 100 | 100 |
| Zinc oxide | 5.0 | 5.0 | 5.0 |
| Sulfur | | | 2.0 |
| Tetramethyl thiuram disulfide | | 1.0 | 1.0 |
| HAF carbon black | 50 | 50 | 50 |
| Stearic Acid | 1.0 | 1.0 | 1.0 |

The physical inspections of the respective vulcanizates upon heat aging were as follows:

| Sample | Formulation | 300% Modulus (p.s.i.) | Tensile Strength (p.s.i.) | Elongation Percent |
|---|---|---|---|---|
| (a) Thiourea modified brominated butyl | (1) | 1,640 | 1,640 | 300 |
|  | (2) | 1,465 | 1,850 | 350 |
|  | (3) | 1,270 | 1,695 | 385 |
| (b) Regular brominated butyl | (1) |  | 915 | 285 |
|  | (2) | 675 | 710 | 350 |
|  | (3) | 755 | 880 | 370 |
| (c) Thiourea modified chlorinated butyl | (1) | 1,660 | 2,085 | 365 |
|  | (2) | 925 | 1,540 | 425 |
|  | (3) | 810 | 1,430 | 470 |
| (d) Regular chlorinated butyl | (1) | 470 | 565 | 365 |
|  | (2) | 255 | 340 | 440 |
|  | (3) | 225 | 335 | 530 |

The above data show that both chlorinated and brominated butyl rubber, when modified by reaction with a thiourea compound, exhibit much better extension moduli and tensile strengths upon heat aging than do regular chlorinated or brominated butyl rubber.

Resort may be had to modifications and variations of the disclosed embodiments of the present invention without departing from the spirit of the invention or scope of the appended claims.

What is claimed is:

1. The product formed by the reaction consisting essentially of the reaction in solution between a halogenated isoolefin-multiolefin rubbery copolymer of at least 85 wt. percent of an isoolefin, said copolymer containing at least 0.5 weight percent halogen on a basis of the total weight of the polymer but not more than about one atom of halogen per double bond; and a minor proportion of a thiourea compound containing a single thiourea group at 20 to 180° C. for 1 to 600 minutes.

2. A composition according to claim 1 which after reaction between thiourea compound and rubbery copolymer has been vulcanized by heating at a temperature between about 200° F. and about 450° F. in the presence of zinc oxide for between about 5 minutes and 5 days.

3. The product formed by the reaction consisting essentially of the reaction at 20 to 180° C. for 1 to 600 minutes between a halogenated isoolefin-multiolefin copolymer of at least 85 wt. percent of a $C_4$ to $C_8$ isoolefin and between about 0.05 to 15.0 weight percent based on copolymer of a thiourea compound, said reaction taking place in solution, said thiourea compound containing a single thiourea group, said copolymer containing at least about 0.5 weight percent combined halogen but not more than about "X" weight percent of a halogen selected from the group consisting of fluorine and chlorine nor more than about 3.0 "X" weight percent of a halogen selected from the group consisting of bromine and iodine, wherein:

$$"X" = \frac{M_3 L}{(100-L)M_1 + L(M_2+M_3)} \times 100$$

and $L$ = mole percent of the multiolefin in the copolymer
$M_1$ = molecular weight of the isoolefin
$M_2$ = molecular weight of the multiolefin, and
$M_3$ = atomic weight of halogen.

4. Composition according to claim 3 in which the thioureau compound in thiourea.

5. Composition according to claim 3 in which the thiourea compound is ethylene thiourea.

6. Composition according to claim 3 in which the thiourea compound is diphenyl thiourea.

7. Composition according to claim 3 in which the thiourea compound is N-methyl ethylene thiourea.

8. Composition according to claim 3 in which the thiourea compound is orthophenylene thiourea.

9. The product formed by the reaction consisting essentially of the reaction between a halogenated rubbery copolymer of 85 to 99.5 wt. percent of a $C_4$ to $C_8$ isoolefin and 15 to 0.5 wt. percent of a $C_4$ to $C_{14}$ multiolefin, the halogen-containing rubbery copolymer containing at least about 0.5 weight percent halogen but not more than about one atom of halogen per double bond in the copolymer and about 0.1 to 10.0 weight percent, based on halogen-containing rubbery copolymer, of a thiourea compound, said thiourea compound containing a single thiourea group, at a temperature level of between about 20° and 180° C. for between about 1 and about 600 minutes, said reaction taking place in solution.

10. A process for the preparation of a thiourea-modified-halogen-containing isoolefin-multiolefin rubbery copolymer which consists essentially of reacting in solution a halogenated isoolefin-multiolefin copolymer of 85 to 99.5 wt. percent of a $C_4$ to $C_8$ isoolefin and at least 0.5 wt. percent of a halogen based on total polymer at a temperature level of between about 20° and 180° C. for between about 1 minute and about 600 minutes with about 0.05 to 15.0 weight percent of a thiourea compound containing a single thiourea group and recovering the thiourea-modified-halogenated rubbery isoolefin-multiolefin copolymer formed from the reaction mixture.

11. Process according to claim 10 in which the thiourea compound is selected from the group consisting of thiourea, ethylene thiourea and mixtures thereof.

12. A process for the preparation of a halogen-containing isoolefin-multiolefin rubbery copolymer of at least 85 wt. percent of a $C_4$ to $C_8$ isoolefin of increased unsaturation which consists essentially of reacting a halogen-containing rubbery copolymer containing at least 0.5 weight percent halogen but not more than 3 atoms of halogen per double bond in the copolymer with 0.05 to 15.0 weight percent of a thiourea compound containing a single thiourea group said reaction being carried out at a temperature of about 20° to 180° C. in the presence of an inert solvent.

13. A process according to claim 10 in which the thiourea is selected from the group consisting of thiourea, ethylene thiourea and mixtures thereof.

14. A process for increasing the unsaturation of a halogenated copolymer of 85 to 99.5 wt. percent of a $C_4$ to $C_8$ isoolefin and 15 to 0.5 wt. percent of a $C_4$ to $C_{14}$ multiolefin, said halogenated copolymer containing at least 0.5 weight percent halogen but not more than 3 atoms of halogen per double bond in the copolymer, which consists essentially of forming a solution of 2 to 50 weight percent halogenated copolymer in an inert solvent, reacting the solution for about 1 to 600 minutes at a temperature of 20° to 180° C. wtih 0.05 to 15.0 weight percent based on copolymer of a thiourea compound containing a single thiourea group and recovering the thus modified halogenated copolymer.

15. The process of claim 14 in which the thiourea compound is selected from the group consisting of thiourea, ethylene thiourea and mixtures thereof.

16. The product of claim 1 wherein said isoolefin-multiolefin rubbery copolymer was reacted with about 0.05 to 15.0 weight percent based on copolymer of said thiourea compound.

References Cited in the file of this patent

UNITED STATES PATENTS

| | | |
|---|---|---|
| 2,148,831 | Raynolds | Feb. 28, 1939 |
| 2,345,507 | Smith | Mar. 28, 1944 |
| 2,544,746 | Baum | Mar. 13, 1951 |
| 2,631,984 | Crawford et al. | Mar. 17, 1953 |
| 2,732,354 | Morrissey et al. | Jan. 24, 1956 |
| 2,804,447 | Kaylor | Aug. 27, 1957 |

FOREIGN PATENTS

| | | |
|---|---|---|
| 795,180 | Great Britain | May 21, 1958 |